United States Patent [19]  
Yokoi et al.

[11] Patent Number: 4,952,354  
[45] Date of Patent: Aug. 28, 1990

[54] DEGATING METHOD

[75] Inventors: Hidetoshi Yokoi, Tokyo; Mikiya Niwa, Urawa; Yasuo Nomura; Takeshi Takahasi, both of Toyama, all of Japan

[73] Assignees: Nissui Kako Co., Ltd, Saitama; Nachi-Fujikoshi Corporation, Toyama, both of Japan

[21] Appl. No.: 348,820

[22] Filed: May 8, 1989

[30] Foreign Application Priority Data

Oct. 5, 1988 [JP] Japan ................. 63-249949

[51] Int. Cl.⁵ ............................ B29C 45/38
[52] U.S. Cl. .................... 264/69; 264/161; 264/328.15; 425/553
[58] Field of Search ............ 264/69, 161, 328.11, 264/328.15, 336; 425/553

[56] References Cited

U.S. PATENT DOCUMENTS 4,466,934 8/1984 Cane et al. .................. 264/161

FOREIGN PATENT DOCUMENTS 61-94733 5/1986 Japan .................... 425/553

Primary Examiner—Jill L. Heitbrink
Attorney, Agent, or Firm—Krass & Young

[57] ABSTRACT

A method for degating an injection molded article comprising the steps of filling a mold cavity with a molten resin and cooling the mold to effect gate seal. A gate cut shaft member is oscillated after gate seal is completed to soften the hardened resin in the gate. The gate cut shaft member is then displaced with respect to the mold cavity when the resin is softened to effect degating. A second method comprises the steps of cutting the gate in the molded article by sliding the gate cut shaft member during the dwell process with respect to the mold cavity after filling the mold with molten resin and before gate seal is effected. While said gate cut shaft member is subject to minute oscillation or a slow reciprocating motion, the shaft surface is abutted against the degated surface to obtain a good cut surface on the molded article.

6 Claims, 4 Drawing Sheets

DEGATING METHOD

FIELD OF INVENTION

The present invention relates generally to a degating method in injection molding of plastics. More particularly, the present invention relates to a degating method wherein a gate is cut in an injection molded product while in a metal mold during the molding process so that the product and runner can be removed separately.

DESCRIPTION OF THE RELATED ART

In the conventional degating methods, a product and runner are removed from a metal mold as a connected unit and the gate is cut in a subsequent process to obtain a completed product. One exception in injection molding is the use of a pin gate, which is one type of gate such as a side gate, pin gate, fan gate, or film gate.

Methods for degating an injection molded product while in a metal mold during molding include a tear cutting method that uses the mechanical movement of a mold component (for example, Unexamined Japanese Patent Publication No. 73826/85) and a shear cutting method (Unexamined Japanese Patent Publication No. 159203/85, Unexamined Japanese Model Publication No. 137517/85). The former method does not produce acceptable products because of variations in cutting position. The latter method, though being useful for cutting gates having relatively small cross-sectional area, is not always useful because fine particles produced during cutting mix with or adhere to the product during the next cycle. This method is useful only for olefin-base materials which are less prone to produce fine particles, such as polyethylene or polypropylene. In general, any degating method in a mold is carried out mechanically when a gate seal has been completed after filling, that is, when the molding material has been cooled. For this reason, the product has a gate mark that significantly reduces the commercial value of the product especially when it is used as an external part.

The conventional methods described above involve cold cutting and have unavoidable problems of production of fine particles during cutting, wear of mold components, and a gate mark remaining on the product. There is a need for a degating method that offers a satisfactory product with good appearance without a gate mark, eliminates the conventional finishing process, and requires no extension of molding time.

SUMMARY OF THE INVENTION

The present invention provides a method for degating injection molded products. A first method according to the invention comprises the steps of generating internal heat in the plastic material near the cutting (gate) position by means of oscillation energy immediately before cutting to permit high-speed cutting of the softened material. The first step in this method comprises filling a mold cavity with molten synthetic polymeric resin. The mold is cooled so that resin in the gate solidifies. A gate cut shaft member configured to slide in relation to the mold cavity is oscillated proximate said mold cavity so as to soften the resin in the gate. The gate cut member is then displaced with respect to the mold cavity to effect degating. This method further includes the steps of abutting the gate cut shaft member against the degated surface of the article and either oscillilating or reciprocating the member so as to obtain a glazed degated surface. In this method, the softened material can be cooled at the same time cutting is performed; therefore, the mold components wear less, the cut surface is uniform and smooth, and a product with good appearance without a gate mark can be obtained. This method has no disadvantage of a longer cycle than the conventional molding cycle since degating is performed in the cooling process of injection molding.

The second method according to this invention comprises the steps of cutting the gate in the molded article by sliding the gate cut shaft member during the dwell process with respect to the mold cavity after filling the mold with molten resin and before gate seal is effected. While said gate cut shaft member is subjected to a minute oscillation or slow reciprocating motion, the member surface is abutted against the degated surface to obtain a good cut surface. This method provides nearly the same effect as the first method.

DETAILED DESCRIPTION OF THE PREFERRED EMBODIMENTS

Figure 1:
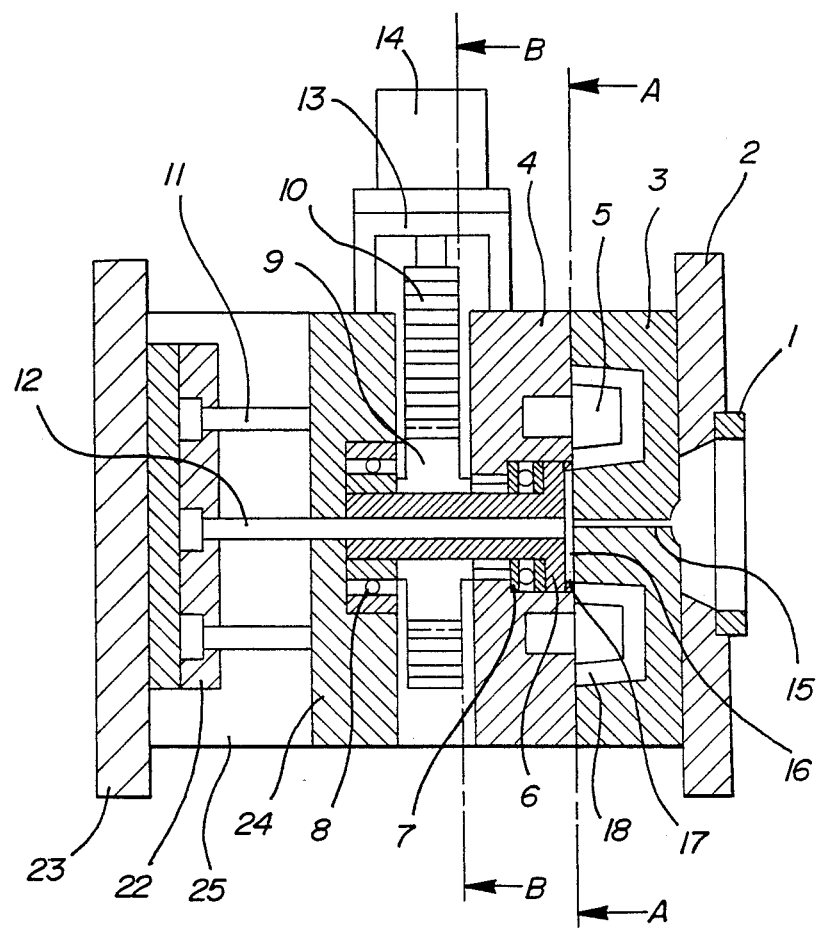
FIG. 1 is a cross-sectional view of a mold used in the degating methods of the present invention.

Referring now to the drawings, FIG. 1 is a cross-sectional view of a mold used in the degating methods of the present invention. A degating device, such as gate cut shaft 6, is mounted to a movable mold at the side of a core plate 4. The metal mold consists of a fixed section and movable section. The fixed section consists of a fixed mold mounting plate 2 that fixedly supports a cavity plate 3 and a rocket ring 1 secured to the fixed mold mounting plate 2.

The movable section consists of a backing plate 24 fixedly supported to a movable mold mounting plate 23 via a support 25, and the core plate 4. The movable section further consists of an ejector plate 22 supported so as to move toward the backing plate 24 and product ejector pins 11 fixed to the ejector plate 22. Product ejector pins 11 extend to a mold cavity 18 through the backing plate 24 and the core plate 4. The movable section also includes a runner ejector pin 12 extending near the surface of a gate cut shaft 6 through the backing plate 24 and the gate cut shaft 6.

Figure 2:
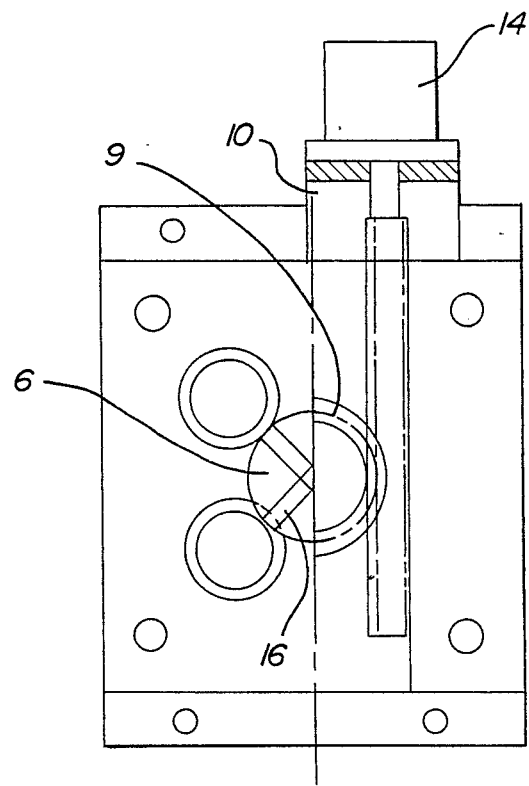
FIG. 2 is a front end view of the mold of FIG. 1. The left half of FIG. 2 is a front sectional view along line AA of FIG. 1. The right half of FIG. 2 is a front sectional view of a degating device of the mold taken along line BB of FIG. 1.
Figure 3:
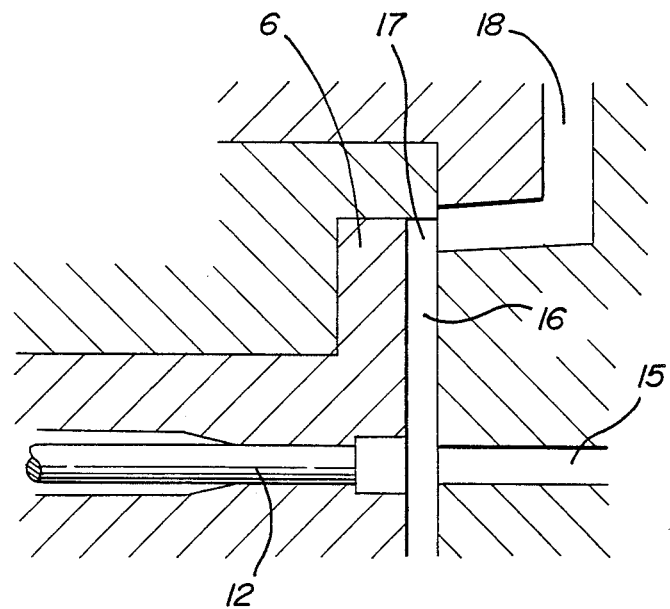
FIG. 3 is a partially enlarged sectional view of a gate section.

At the center of the movable mold, gate cut shaft 6 is rotatively supported by a combination bearing 7 and a radial bearing 8 mounted on the core plate 4 and the backing plate 24, respectively. The gate cut shaft 6 is rotated by the movement of a servo cylinder 14 via a pinion 9 and a rack 10. The surface of the gate cut shaft 6 facing the cavity plate 3 has runners 16 in the radial direction forming a gate section connecting the sprue 15 with the cavity 18 as shown in FIG. 2 and FIG. 3. The outer end of the runner 16 constitutes a gate 17 at the portion connected to the cavity 18 (FIG. 3).

The first degating method will now be described. When injection is initiated from the nozzle tip of an injection molding machine (not shown) into the sprue 15, the cavity 18 is filled with molten resin that passes through the sprue 15, the runner 16, and gate 17. When filling is completed, a cooling process starts while dwelling. Dwelling is that process during injection molding where the filling pressure is held during cooling to compensate for shrinkage because resin shrinks as it cools. The gate 17 cools and solidifies, otherwise referred to as gate seal. Since the cross-sectional area of the gate 17 is usually smaller than any portion of the cavity 18, the gate 17 cools more rapidly than the product, eliminating the effect of dwelling after gate seal. Therefore, degating on completion of gate seal does not have any effect on the product.

On completion of gate seal, a high-pressure hydraulic oil produced by a hydraulic unit 20 (FIG. 4) drives a servo valve 19 at a frequency programmed by a servo controller 21, resulting in the reciprocating movement of the servo cylinder 14 shown in FIG. 1. The reciprocating movement of the servo cylinder 14 causes minute oscillation of the gate cut shaft 6 via the rack 10 and the pinion 9, and this oscillation energy in turn generates heat to soften the resin at the interface between the cavity 18 and the gate 17. The degree of softening can be controlled by programming the frequency and oscillating time of the servo controller 21.

When the resin at the gate 17 is softened, the gate cut shaft 6 is forcedly displaced in rotation by a desired amount to cut the gate 17. The amount of displacement can be programmed by the servo controller 21.

The heat generation due to the oscillation energy occurs only in the resin; the heat generation on the cutting surface of the gate cut shaft 6 is negligible, so that the softened portion is suddenly cooled at the same time the gate is cut.

Since the softening and cutting process is completed in merely a few seconds, this process can be carried out at the same time the product section is cooled, resulting in productivity as high as that of the conventional molding method.

After the degating and cooling are completed, the mold is opened as with the conventional injection molding to remove the product and runner. This completes the molding process.

Furthermore, after the gate 17 is cut, the gate cut shaft 6 is abutted against the cut surface of the molded product while being minutely oscillated by the servo cylinder 14 via the rack 10 and the pinion 9 to grind the gate cut surface. Alternatively, this oscillation of the gate cut shaft 6 can be replaced by a slow reciprocating motion for a short period of time.

A second degating method according to the present invention will now be described. The metal mold shown in FIGS. 1 through 4 is also used for the second degating method. When injection is initiated from the nozzle tip of an injection molding machine (not shown) into the sprue 15, the cavity 18 is filled with molten resin that passes through the sprue 15, the runner 16, and gate 17. When filling is completed, a cooling process starts while dwelling, the stage preceding the gate seal.

As the gate 17 starts to solidify, the viscosity of resin at the gate 17 remarkedly increases, there being a condition in which the shrunk amount of resin cannot be compensated by dwelling, but cutting can be performed. The gate 17, usually having the smallest cross-sectional area, tends to solidify first in the dwell process after injection in the injection cycle. When some time has elapsed after the start of the dwelling process, there is a time period when the resin is too hard to feed into the cavity 18 by dwelling but is soft enough to be cut. At this period of time, the gate cut shaft 6 is rotated by the servo cylinder 14 to cut the gate 17. The servo cylinder 14 is driven via the servo valve 19 at a frequency programmed by the servo controller 21, allowing the gate cut shaft 6 to minutely oscillate for a short period of time. At the time the gate is cut, the degated surface remains soft. Rubbing the mold grinding surface of the gate cut shaft 6 against the degated surface provides a lapping effect, resulting in a glazed finish of the degated surface of the molded product. Since the degating and subsequent abutting processes are completed in a few seconds, productivity as high as that of the conventional injection molding can be assured. Also, degating in accordance with the present invention produces a sound product since degating is performed at the time when dwelling becomes ineffective.

Figure 5:
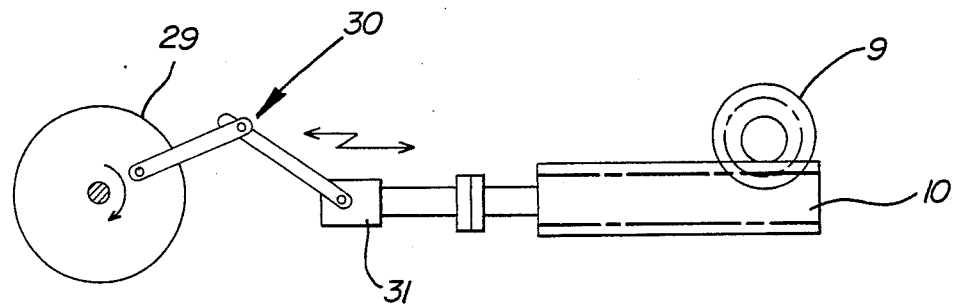
FIG. 5 is a schematic diagram of a device for a mold gate section.

For some types of resin, a good glazed degated surface can be obtained by abutting the mold grinding surface of the gate cut shaft 6 against the degated surface of the product while the gate cut shaft 6 is slowly subjected to reciprocative rotation in place of minute oscillation after degating. The slow reciprocating motion is provided, for example, by the rack 10 shown in FIG. 1 fixed to a reciprocating member 31 in FIG. 5 that is connected to a crank wheel 29 via a connecting link 30. After the degating and cooling are completed, the mold is opened as with the conventional injection molding to remove the runner and product molded in the cavity 18. This completes the molding process.

Figure 4:
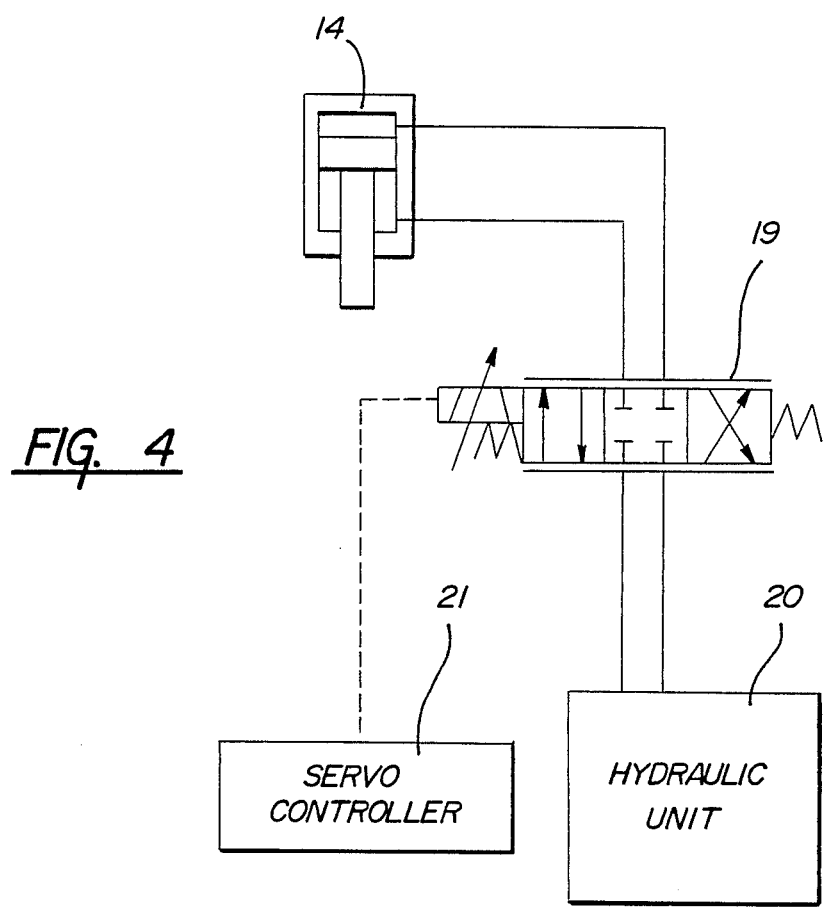
FIGS. 4 and 6 are block diagrams showing alternative drive systems for a servo cylinder of FIG. 1.
Figure 6:
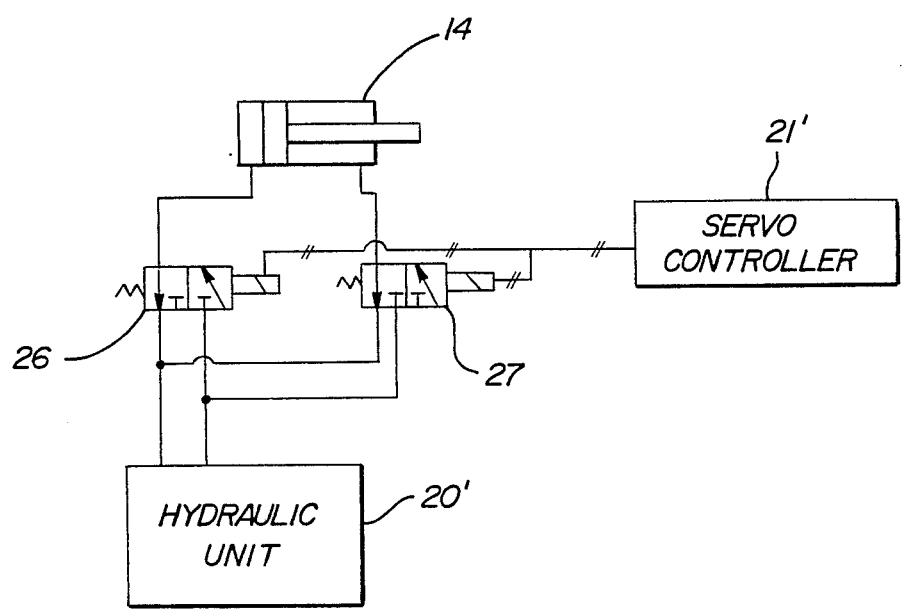
Figure 7A:
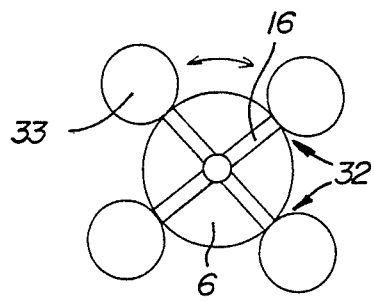
FIGS. 7(a–d) are plan views of alternative mold gate sections.
Figure 7B:
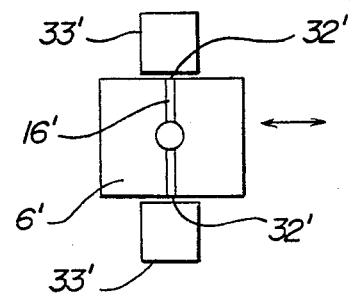
Figure 7C:
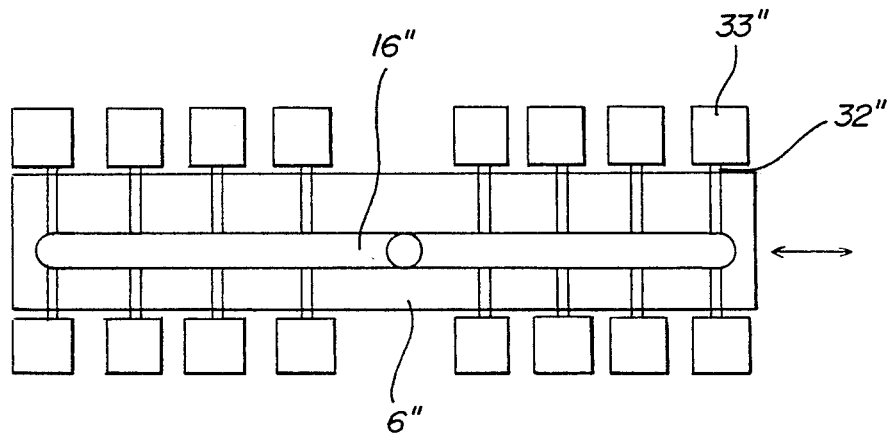
Figure 7D:
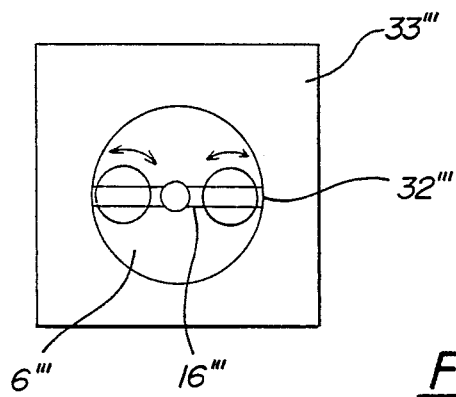

FIG. 6 is a block diagram showing the drive system of the servo cylinder 14 other than that shown in FIG. 4. This system uses two high-speed response solenoid valves 26 and 27 in place of the servo valve 19 in FIG. 4 to drive the servo cylinder 14 in nearly the same way as the drive system in FIG. 4. Although the gate cut shaft 6 (including those shown in FIG. 7 (a) and (d)) has been explained as a mold component rotatively supported in the mold in FIG. 1 through FIG. 3, a degating member 6′ or 6″ may be used that is supported by a device (not shown) so as to reciprocatively slide in the mold. In FIGS. 7 (a–d), 33, 33′, 33″, and 33‴ are products, and 16, 16′, 16″ and 16‴ are runners (gate sections). The degating members 6′ and 6″ are connected to the servo cylinder 14 or the reciprocating member 31 to provide a reciprocating motion.

As described above, the degating methods according to the invention offer satisfactory products having good appearance without a gate mark, eliminate the subsequent finishing process and require no extended molding time since the softening of resin and cutting of gates can be performed in merely a few seconds at the same time the product is cooled. The methods also allow the free determination of the gate size, in contrast to the conventional method requiring a cross-sectional area of the gate to be as small as possible to facilitate degating and obtain products with good appearance. A larger gate permits adequate dwelling resulting in improved dimensional accuracy. Furthermore, the runner can be removed at the same time the product is removed and immediately ground into pellets. Therefore, the period of time before grinding the runner is far shorter than that in the conventional method, which reduces the amount of moisture absorbed during this period of time. This offers an advantage of greatly reduced drying time.

We claim:

1. A method for degating an injection molded article formed in a mold having a sprue, a runner and a gate interconnected to a mold cavity, comprising the steps of:

filling said mold cavity with a molten synthetic polymeric resin;

cooling the mold so as to seal said gate;

thereafter oscillating a gate cut shaft member configured to slide in relation to said mold cavity proximate said gate to soften said resin in said gate; and displacing said gate cut shaft member with respect to said mold cavity once said resin in said gate is sufficiently softened so as to degate said resin.

2. A method for degating as in claim 1, further including the step of abutting said gate cut shaft member against the degated surface of said article while said gate cut shaft member is oscillating.

3. A method for degating as in claim 1, further including the step of abutting the gate cut member against the degated surface of said article and reciprocating said gate cut shaft member.

4. A method for degating an injection molded article formed in a mold having a sprue, a runner and a gate interconnected to a mold cavity, comprising the steps of:

filling said mold cavity with a molten synthetic polymeric resin;

sliding a gate cut shaft member with respect to said mold cavity during dwelling of said article and prior to gate seal so as to degate said resin; and finishing a degate surface of said article by rubbing a mold grinding surface of said gate cut shaft member against said degated surface during cooling of said article.

5. The method for degating an injection molded article as in claim 4 wherein the step of rubbing a mold grinding surface of said gate cut shaft member against said degated surface is performed by oscillating said gate cut shaft member against said degated surface.

6. The method for degating an injection molded article as in claim 4, wherein the step of rubbing a mold grinding surface of said gate cut shaft member against said degated surface is performed by reciprocating said gate cut shaft member against said degated surface of said article.

* * * * *